United States Patent [19]

Hass et al.

[11] Patent Number: 4,576,814

[45] Date of Patent: * Mar. 18, 1986

[54] CATALYST AND PROCESS FOR OXIDIZING HYDROGEN SULFIDE

[75] Inventors: Robert H. Hass, Fullerton; John W. Ward, Yorba Linda, both of Calif.

[73] Assignee: Union Oil Company of California, Los Angeles, Calif.

[ * ] Notice: The portion of the term of this patent subsequent to Apr. 24, 2001 has been disclaimed.

[21] Appl. No.: 566,296

[22] Filed: Dec. 28, 1983

Related U.S. Application Data

[63] Continuation-in-part of Ser. No. 364,416, Apr. 1, 1982, Pat. No. 4,444,742, which is a continuation-in-part of Ser. No. 191,864, Sep. 29, 1980, abandoned, which is a continuation-in-part of Ser. No. 27,033, Apr. 4, 1979, Pat. No. 4,314,983.

[51] Int. Cl.⁴ .................... C01B 17/02; C01B 17/16; C01B 17/48

[52] U.S. Cl. .................. 423/573 G; 423/224; 423/230; 423/539; 423/542

[58] Field of Search ............... 423/573 G, 230, 522, 423/535, 539, 542, 574 R

[56] References Cited

U.S. PATENT DOCUMENTS

| | | | |
|---|---|---|---|
| 349,981 | 9/1886 | Claus | 423/573 |
| 1,695,285 | 12/1928 | Jaeger et al. | 423/535 |
| 1,895,724 | 1/1933 | Miller et al. | 423/224 |
| 1,900,751 | 3/1933 | Baehr | 423/224 |
| 2,083,894 | 6/1937 | Connolly | 423/573 |
| 2,083,895 | 6/1937 | Connolly | 423/573 |
| 2,697,064 | 12/1954 | Brown | 423/576 |
| 2,836,481 | 5/1958 | Hofstede | 423/573 G |
| 2,889,207 | 6/1959 | Eliot | 423/574 |
| 2,958,586 | 11/1960 | Barber | 423/576 |
| 3,232,978 | 2/1966 | Yasuhara et al. | 252/456 |
| 3,438,721 | 4/1969 | Innes | 423/576 |
| 3,488,402 | 1/1970 | Michaels et al. | 252/464 |
| 3,492,248 | 1/1970 | Notari et al. | 252/456 |
| 3,702,886 | 11/1972 | Argauer et al. | 423/328 |
| 3,709,979 | 1/1973 | Chu | 423/328 |
| 3,752,877 | 8/1973 | Beavon | 423/244 |
| 3,798,315 | 3/1974 | Nicklin | 423/574 |
| 3,848,071 | 11/1974 | Groenendaal | 423/574 |
| 3,907,919 | 9/1975 | Lo et al. | |
| 3,997,655 | 12/1976 | Reh et al. | 423/533 |
| 4,012,486 | 3/1977 | Singleton | 423/224 |
| 4,019,880 | 4/1977 | Rabo et al. | 55/68 |
| 4,048,293 | 9/1977 | Renault et al. | 423/574 L |
| 4,061,724 | 12/1977 | Grose et al. | 423/335 |
| 4,088,743 | 5/1978 | Hass et al. | 423/539 |
| 4,092,404 | 5/1978 | Hass | 423/539 |
| 4,123,507 | 10/1978 | Hass | 423/573 G |
| 4,153,674 | 5/1979 | Verloop et al. | 423/573 R |
| 4,169,136 | 9/1979 | Hass et al. | 423/539 |
| 4,171,347 | 10/1979 | Hass | 423/539 |
| 4,243,647 | 1/1981 | Hass et al. | 423/573 G |
| 4,246,141 | 1/1981 | Hass et al. | 252/455 Z |
| 4,279,882 | 7/1981 | Beavon | 423/574 R |
| 4,311,683 | 1/1982 | Hass et al. | 423/573 G |
| 4,331,639 | 5/1982 | Hass et al. | 423/235 |
| 4,347,227 | 8/1982 | Hass et al. | 423/235 |
| 4,362,653 | 12/1982 | Robinson | 252/455 Z |
| 4,372,932 | 2/1983 | Hass | 423/235 |
| 4,386,058 | 5/1983 | Hass | 423/235 |
| 4,401,556 | 8/1983 | Bezman et al. | 208/111 |
| 4,419,271 | 12/1983 | Ward | 502/65 |
| 4,432,961 | 2/1984 | Hass et al. | 423/542 |
| 4,444,741 | 4/1984 | Hass et al. | 423/542 |
| 4,444,742 | 4/1984 | Hass et al. | 423/542 |
| 4,444,908 | 4/1984 | Hass et al. | 423/542 |

FOREIGN PATENT DOCUMENTS

| | | | |
|---|---|---|---|
| 522199 | 10/1955 | Belgium | 423/535 |
| 917164 | 12/1972 | Canada | |
| 1125731 | 6/1982 | Canada | |
| 1070681 | 2/1953 | France | 423/574 |
| 2032465 | 11/1970 | France | |
| 2376686 | 1/1978 | France | |
| 78096 | 5/1955 | Netherlands | |
| 13844 | of 1897 | United Kingdom | |
| 319396 | 9/1929 | United Kingdom | 423/574 |
| 341725 | 1/1931 | United Kingdom | |
| 600118 | 3/1948 | United Kingdom | 423/573 G |
| 733004 | 7/1955 | United Kingdom | 423/230 |
| 749645 | 5/1956 | United Kingdom | |

OTHER PUBLICATIONS

"When is a Zeolite Not a Zeolite" by Rees, *Nature* vol. 296, pp. 491-492.

"Research Article Triggers Dispute on Zeolite" by Bodiansky, *Nature*, vol. 300, p. 309.

"Chemical and Physical Properties of the ZSM-5 Substitutional Series" by Olson et al., *Journal of Catalysis*, vol. 61, pp. 390-396.

Abstract of Great Britain Pat. No. 1558656.

"Physcio-Chemical Properties of Bismuth Pyrovanadate Catalyst" by Sinhamahapatra et al., *Chemical Abstracts*, vol. 87, No. 58873Z.

"World's First Recycle Selectox Sulfur Recovery Unit" by Goar, Preprint, 32nd Gas Conditioning Conference, Norman, Okla., Mar. 10, 1982.

"Packaged Selectox Units—A New Approach to Sulfur Recovery" by Hass et al., Preprint, 60th Annual GPA Convention, Mar. 23-25, 1981, San Antonio, Tex.

"Process Meets Sulfur Recovery Needs" by Hass et al. set forth in *Hydrocarbon Processing*, pp. 104 to 107, May, 1981.

(List continued on next page.)

*Primary Examiner*—Gary P. Straub
*Attorney, Agent, or Firm*—Dean Sandford; Gregory F. Wirzbicki

[57] ABSTRACT

Catalysts comprising bismuth and vanadium components are highly active and stable, especially in the presence of water vapor, for oxidizing hydrogen sulfide to sulfur or $SO_2$. Such catalysts have been found to be especially active for the conversion of hydrogen sulfide to sulfur by reaction with oxygen or $SO_2$.

49 Claims, No Drawings

OTHER PUBLICATIONS

"Packaged Selectox Units" by Hass et al. set forth in *Oil and Gas Journal*, pp. 100 to 104, Oct. 12, 1981.

"Zeolon Acid Resistant Molecular Sieve" Bulletin Z-50, Norton Chemical Process Products Division, Akron, Ohio, 1970.

"Developments in Selectox Technology" by Beavon et al., Seventh Canadian Symposium on Catalysis, Edmonton, Alberta, Oct. 19-22, 1980.

"High Recovery, Lower Emissions Promised for Claus-Plant Tail Gas" by Beavon et al. set forth in *Oil and Gas Journal*, pp. 76 to 80, (Mar. 12, 1979).

"Silicalite, a New Hydrophobic Crystalline Silica Molecular Sieve" by Flanigen et al., *Nature*, vol. 271, pp. 512-516.

"Silicalite-2, a Silica Analogue of the Aluminosilicate Zeolite ZSM-11" by Bibby et al., *Nature*, vol. 280, pp. 664-665.

"Zoned Aluminum Distribution in Synthetic Zeolite ZSM-5" by Ballmoos et al. in *Nature*, vol. 289, pp. 782-783.

"Crystal Structure of Tetrapropylammonium Fluoride-Silicalite" by Price et al. *Nature*, vol. 292, pp. 818-819.

"Resolving Crystallographically Distinct Tetrahedral Sites in Silicalite and ZSM-5 by Solid State NMR" by Fyfe, *Nature*, vol. 296, pp. 530-533.

Kirk-Othmer *Encyclopedia of Chemical Technology*, 2nd Ed., vol. 19, pp. 467-469.

Beavon et al. "BSR/Selectox I Sulfur Recovery Process for Claus Tail Gas Treating" 5th Canadian Symposium on Catalysis, Oct. 26-27, 1977 in Calgary, Alberta, Canada.

Flanigen et al. "Silicalite, a New Hydrophobic Crystalline Silica Molecular Sieve" set forth in *Nature*, vol. 27, No. 5645 (Feb. 1978).

"Catalyst for the Oxidation of Benzene to Maleic Anhydride" by Di Cio et al. in *Chemical Abstracts*, vol. 75, No. 37065z (1971).

"Dibenzofuran" by Moggi et al. in *Chemical Abstracts*, vol. 85, No. 108512n (1976).

"Acetic Acid by Catalytic Oxidation of Butenes" by Yamashita et al. in *Chemical Abstracts*, vol. 72, No. 42815m (1970).

"Mixed Catalysts with High Structural Resistance" by Brockhaus *Chemical Abstracts*, vol. 65, No. 4713d.

"Activity of Molybdenum Oxide—Bismuth Oxide Catalysts and the Influence of Metallic Oxide Mixtures" by Popescu et al. in *Chemical Abstracts* vol. 74, No. 25421d (1971).

"Acrylonitrile by Catalytic Propene Ammoxidation" by Ghirga et al. in *Chemical Abstracts*, vol. 81, No. 38074n (1974).

"Catalytic Manufacture of Acrylonitrile" by Umemura et al. in *Chemical Abstracts*, vol. 88, No. 51341m (1978).

"Acrylic Acid by Catalytic Oxidation of Propene" by Hensel et al. in *Chemical Abstracts*, vol. 78, No. 71464a (1973).

"Catalytic Production of Isoprene" by Watanabe et al. in *Chemical Abstracts*, vol. 74, No. 127156p (1971).

"Manufacture of Benzonitrile" by Mamedaliev in *Chemical Abstracts*, vol. 89, No. 42848a (1978).

"Isoprene" by Watanabe et al. in *Chemical Abstracts*, vol. 75, No. 37602x (1971).

CATALYST AND PROCESS FOR OXIDIZING HYDROGEN SULFIDE

CROSS-REFERENCE TO RELATED APPLICATIONS

This application is a continuation-in-part of application Ser. No. 364,416 filed Apr. 1, 1982, now U.S. Pat. No. 4,444,742 which is a continuation-in-part of application, Ser. No. 191,864 filed Sept. 29, 1980, now abandoned which is a continuation-in-part application of Ser. No. 27,033 filed Apr. 4, 1979, now U.S. Pat. No. 4,314,983.

BACKGROUND OF THE INVENTION

This invention relates to a process for oxidizing $H_2S$, and particularly to a process for catalytically oxidizing $H_2S$ to sulfur, $SO_2$, or both in the presence of a substantial proportion of water vapor.

Current air pollution regulations are very restrictive concerning the amount of $H_2S$ that may be discharged to the atmosphere. In some instances, gas streams may not be discharged to the atmosphere if they contain more than about 10 ppmv of $H_2S$. Thus, many processes have been developed to remove $H_2S$ from gas streams prior to their discharge to the atmosphere.

One method known in the art for removing $H_2S$ involves catalytic oxidation, that is, a gas stream containing $H_2S$ is blended with air or free oxygen, and the resulting mixture is then passed through a bed of catalyst particles under appropriate conditions such that the $H_2S$ is converted to elemental sulfur vapor or $SO_2$, or both, as desired. One catalyst useful for the gas phase conversion of $H_2S$ to sulfur or $SO_2$ is disclosed in U.S. Pat. No. 4,092,404; it comprises one or more vanadium oxides or sulfides supported on a refractory oxide such as alumina or silica-alumina. Another reference, U.S. Pat. No. 4,012,486, discloses a process wherein a catalyst having active components consisting of bismuth is used to catalytically incinerate $H_2S$ to $SO_2$.

When compared, the bismuth catalyst of U.S. Pat. No. 4,012,486 will generally be found less active than the vanadia catalyst of U.S. Pat. No. 4,092,404 for oxidizing $H_2S$ to $SO_2$. On the other hand, a bismuth catalyst is much more stable than a vanadia catalyst at operating temperatures below about 600° F. when $H_2S$ must be removed from a gas stream, such as an off-gas derived from a geothermal power plant, which contains water vapor at a water vapor partial pressure above 1.0 p.s.i.a., usually at least 4.0 p.s.i.a. In general, vanadia catalysts have satisfactory stability in the presence of water vapor at partial pressures below about 1.0 p.s.i.a. or at operating temperatures above about 600° F., but under the combined conditions of temperature below 600° F., and water vapor partial pressures above about 1.0 p.s.i.a., and particularly at 1.5 p.s.i.a. or above, vanadia catalysts deactivate rapidly. It is believed that the reason for this deactivation is due to a complex series of chemical reactions involving the conversion of the vanadium oxide or sulfide active catalytic components to less active forms of vanadium, such as vanadyl sulfate ($VOSO_4$).

As stated above, vanadia catalysts are highly active for the oxidation of $H_2S$ and, as disclosed in U.S. Pat. No. 4,243,647, such catalysts have proven most useful for oxidizing $H_2S$ to sulfur by reaction with either oxygen or $SO_2$. In the presence of less than about 1.0 p.s.i.a. water vapor, vanadia catalysts have proven to be remarkably stable, providing high conversions of $H_2S$ to sulfur for a time period of more than one year with little if any deactivation being noticed. But because vanadia catalysts have also been found to be subject to deactivation when the water vapor partial pressure of the gases in contact therewith exceeds 1.0 p.s.i.a., with the rate of deactivation generally increasing with increasing water vapor partial pressure above 1.0 p.s.i.a., it is an object of the invention to improve the deactivation resistance of vanadium-containing catalysts for the oxidation of $H_2S$ to $SO_2$ or elemental sulfur in the presence of water vapor at partial pressures of 1.0 p.s.i.a. or more. And despite the high activity of vanadia catalysts for oxidizing $H_2S$ to $SO_2$ or sulfur, it is yet another object to provide a vanadium-containing catalyst of substantially improved activity for oxidizing $H_2S$ to $SO_2$ or sulfur. It is an additional object of the invention to achieve the foregoing objects while minimizing both the formation of the $SO_3$ and the oxidation of components such as $H_2$, $CO$, $NH_3$, and $CH_4$ that might also be present during the catalytic oxidation of $H_2S$ to $SO_2$ or sulfur. Other objects and advantages will become apparent from the following description of the invention.

SUMMARY OF THE INVENTION

It has now been found that catalysts comprising bismuth and vanadium components are highly active for the gas phase oxidation of hydrogen sulfide to sulfur dioxide or elemental sulfur. In addition, catalysts comprising vanadium and bismuth remain catalytically stable (i.e., resist deactivation) for oxidizing $H_2S$ to $SO_2$ or elemental sulfur in the presence of water vapor, and, in one embodiment of the invention, the oxidation of $H_2S$ to sulfur or $SO_2$ is catalytically promoted in a reaction zone wherein the operating temperature is below 600° F. and the water vapor partial pressure is above about 1.0 p.s.i.a. In this embodiment of the invention, the water vapor may initially be present in the gases contacted with the catalyst at a partial pressure above about 1.0 p.s.i.a., or, because the oxidation of $H_2S$ produces an equivalent volume of water, the water vapor partial pressure may initially be below 1.0 p.s.i.a. but increase above about 1.0 p.s.i.a. during contact with the catalyst.

An advantage in the invention resides in the highly selective nature of the catalyst. Operating conditions are readily found for oxidizing $H_2S$ to sulfur and/or $SO_2$ while at the same time minmizing the oxidation of such components as $H_2$, $CO$, $NH_3$, and saturated hydrocarbon gases containing no more than 6 carbon atoms (i.e., light hydrocarbons). Additionally, the oxidation of $H_2S$ to sulfur and/or $SO_2$ without producing essentially any $SO_3$ is attainable, even at operating temperatures up to about 900° F. And even when conditions of excess oxygen above that for the conversion of $H_2S$ to $SO_2$ are employed, the catalyst is useful for selectively promoting the conversion to the desired product while leaving $H_2$, $CO$, $NH_3$, and light hydrocarbons essentially unoxidized and/or while preventing the formation of a substantial amount of $SO_3$.

All references herein to catalysts containing vanadium and bismuth or to catalysts containing vanadium and bismuth components include within their meaning catalysts active for oxidizing $H_2S$ containing (1) elemental vanadium and elemental bismuth, (2) elemental vanadium and one or more bismuth compounds, (3) elemental bismuth and one or more vanadium compounds, (4) one or more vanadium compounds and one or more bismuth compounds, (5) one or more compounds of bismuth and vanadium (e.g., a bismuth vanadate), or (6) a combination of any of the foregoing.

DETAILED DESCRIPTION OF THE INVENTION

Active catalysts for use in the invention comprise vanadium and bismuth as the essential active components. The essential active components may be present as the elements V and Bi, or as a mixture of individual vanadium and bismuth compounds (for example, $Bi_2S_3$ admixed with $V_2S_5$), or as a compound of both bismuth and vanadium, such as $Bi(VO_3)_3$, $BiVO_4$, $Bi_2O_3 \cdot V_2O_5$, or $Bi_4(V_2O_7)_3$. Alternatively, the catalyst may contain any combination of elements and compounds of vanadium and bismuth as the essential active components. Preferred catalysts contain at least one vanadium oxide or sulfide (e.g., $V_2O_5$, $V_2O_3$, $V_2S_5$, and $V_2S_3$) and at least one bismuth oxide or sulfide (e.g., $BiO$, $Bi_2O_3$, $Bi_2O_5$, $BiS$, $Bi_2S_3$, and $Bi_2O_4$).

The typical catalyst contains vanadium and bismuth components in an intimate mixture, and although the catalyst may consist essentially of such a mixture, it is highly preferred that the vanadium and bismuth components be composited, as by impregnation or comulling, with a carrier material. The carrier (or support) material usually comprises a porous refractory oxide, including, for example, such preferred refractory oxides as alumina, silica, zirconia, titania, magnesia, silica-alumina, silica-zirconia, silica-titania, silica-magnesia, silica-zirconia-titania, and combinations thereof. Suitable refractory oxides include acidic metal phosphates and arsenates, such as aluminum phosphate, boron phosphate, aluminum arsenate, chromium phosphate, etc. Other suitable supports include the hydrophobic, crystalline silicas, such as the silicalites taught in U.S. Pat. No. 4,061,724. (As used herein, a refractory oxide is hydrophobic if it is capable of absorbing no more than about 0.5 cc of water per gram.) Also suitable are the amorphous and crystalline aluminosilicate zeolites, whether naturally occurring or synthetically made. The most useful crystalline aluminosilicate zeolites are ion-exchanged so as to remove essentially all ion-exchangeable alkali or alkaline earth components. Of particular usefulness are the crystalline aluminosilicate zeolites which are hydrophobic and essentially free of alkali and alkaline earth components. Illustrative of such zeolites are the ZSM-5 zeolite disclosed in U.S. Pat. No. 3,702,886, the ZSM-11 zeolite disclosed in U.S. Pat. No. 3,709,979, and the several hydrophobic zeolites disclosed in U.S. Pat. No. 4,019,880. Such zeolites are characterized by high ratios of silica to alumina.

One highly preferred refractory oxide carrier is silica-alumina when the alumina is present in a proportion of at least 10 weight percent, preferably between about 20 and 30 weight percent. Catalysts prepared from such supports are usually more active for oxidizing $H_2S$ than are catalysts prepared with many other refractory oxides. In addition, these silica-alumina supports are highly resistant to sulfation, that is, in the presence of $SO_3$ and/or $SO_2$ plus $O_2$, they are resistant to the formation of aluminum sulfate and the consequent loss of surface area, crushing strength, and activity. In general, it can be expected that catalysts prepared from silica-alumina supports containing at least 10 weight percent alumina will experience little if any deactivation due to sulfation under the process conditions hereinafter described.

Another highly preferred support is alumina, especially gamma alumina. Although alumina is subject to deactivation due to sulfation, alumina-supported vanadium-bismuth catalysts are more active catalytically for oxidizing $H_2S$ than comparable catalysts containing silica-alumina. Thus, in situations wherein the concern is for the highest possible activity regardless of sulfation effects, alumina presents an advantage over silica-alumina. In particular, alumina supports are often utilized in instances wherein the temperature of the feed gas is insufficient for ignition of $H_2S$ with silica-alumina supports but not with alumina supports. For example, feed gases laden not only with $H_2S$ but also with high proportions of water vapor, such as many geothermal steam-derived gases containing 90% or more by volume steam, require a relatively high temperature before ignition commences with silica-alumina supports, and rather than preheating such feed gases to a high ignition temperature, it is usually far more desirable to select a more active alumina-supported catalyst requiring either no preheating of the feed gas or substantially less than that required for a comparable silica-alumina-supported catalyst.

When gas streams containing relatively large proportions of water vapor are to be treated with a catalyst prepared from alumina, silica-alumina, or other porous support materials, it is preferred that the catalyst have pore size characteristics preventing capillary condensation of water in a substantial number of the pores. In general, porous catalysts typically utilized in the invention have mean pore diameters greater than about 50 angstroms, and such catalysts, as well as many catalysts of mean pore diameter below 50 angstroms, are useful in environments wherein the water vapor partial pressure is less than about 75% of the saturation pressure. However, when the water vapor partial pressure increases above about 75% of the saturation pressure, capillary condensation of liquid water in the pores of the catalyst may interfere to an undesirable extent with the diffusion of $H_2S$ and oxidant reactants to the catalytic active sites within the pores. These detrimental effects of capillary condensation may be reduced by either lowering the water vapor partial pressure, increasing the operating temperature, or increasing the size of the pores, and in many instances, it is most convenient to prepare the catalyst with a porous support suited to the water environment than to raise the operating temperature or remove water in a contact condenser or other separation means. To this end, it has been determined by calculation that pores having diameters of 200 angstroms or greater will not encounter significant capillary condensation if the water vapor is present at a partial pressure no greater than about 95% of the saturation pressure. Similarly, pores of 80 angstroms diameter or greater will not encounter a significant amount of capillary condensation at water vapor partial pressure up to about 88% of the saturation pressure. Accordingly, a substantial number of the pores in a catalyst having a mean pore diameter of 200 angstroms or more will remain free of liquid water at water vapor partial pressures up to at least 95% of saturation while a mean pore diameter of 80 angstroms or more yields a similar result up to 88% of the saturation pressure.

There are several methods known in the art by which vanadium and bismuth components may be composited with a refractory oxide support. One such method involves impregnation, that is, a suitable support, such as pellets or extrudates of 75% $SiO_2$-25% $Al_2O_3$ silica-alumina, is contacted with a solution of ammonium vanadate (or other soluble vanadium compound), dried at an elevated temperature (usually about 230° F.), and then contacted with a solution of a bismuth salt, such as an acidic solution of a bismuth nitrate or chloride. The composite may also be prepared by any of a variety of comulling techniques. A typical procedure involves mulling silica-alumina with solid ammonium metavanadate, solid bismuth nitrate, and sufficient water to create a paste suitable for extrusion through a die. More preferably, either or both of the vanadium and bismuth salts may be added to the mulling mixture in solution form. In a preferred embodiment, a mixture of silica-alumina, a solution of bismuth nitrate in dilute nitric acid, and an aqueous solution of ammonium metavanadate are comulled. Alternatively, a silica-alumina or other refractory oxide is comulled, for example, with an ammonium metavanadate solution, then dried or calcined at an elevated temperature, and then comulled with an aqueous solution of a bismuth salt, such as a solution of bismuth nitrate in dilute nitric acid. Comulling may also be accomplished by mixing silica-alumina with one or more bismuth vanadates in the presence of water. Alternatively still, the composite may be prepared by a combination of impregnation and comulling techniques, as by impregnating silica-alumina with ammonium vanadate, calcining, and then comulling with an acidic solution of bismuth nitrate or chloride.

After a composite is prepared by one of the foregoing impregnation and/or comulling methods or their equivalents, the composite is calcined, usually at a temperature between about 700° and about 1600° F., preferably 900° to 1200° F. Calcination produces a catalyst containing vanadium and bismuth largely in the form of the oxides thereof, but the 700° to 1600° F. calcination may also produce sufficient bismuth vanadate, usually in the form of monoclinic bismuth orthovanadate ($BiVO_4$), to be detected by X-ray diffraction analysis. Bismuth orthovanadate and other bismuth vanadates are often produced even when impregnation or comulling is accomplished without the deliberate addition of a bismuth vanadate. For example, when silica-alumina is comulled (as in Example I hereinafter) with ammonium metavanadate, then further comulled with an acidic solution of bismuth nitrate, extruded, cut into particulate form, and then calcined at 900° to 1000° F., the final product was found to contain sufficient bismuth orthovanadate to be detected by X-ray diffraction analysis.

Finished catalysts herein should contain at least 5.0 weight percent of vanadium and 5.0 weight percent of bismuth, calculated as $V_2O_5$ and $Bi_2O_3$, respectively. It has been found that catalysts containing less than 5.0 weight percent of either metal, while more active or stable than catalysts containing either vanadium components or bismuth components alone, are somewhat less active and less stable than catalysts containing at least 5.0 weight percent of each component. Preferably, the catalyst contains between 5 and 15 weight percent of each component, but it may contain higher proportions, for example, up to about 20 weight percent, even up to 40 weight percent of each component. Such increased metal loadings, however, are not necessary and usually provide little if any advantage over catalysts containing 15 percent or less of each metal. A highly preferred catalyst, for example, contains between about 7 and 15 weight percent vanadium as $V_2O_5$ and between about 8 and 15 weight percent bismuth as $Bi_2O_3$, with the most highly preferred catalyst containing at least 8.0 weight percent vanadium components as $V_2O_5$ and at least 10 weight percent bismuth components as $Bi_2O_3$. (All calculations herein with respect to the proportions of active metal components on the catalyst are reported as the weight percent of vanadium and bismuth as $V_2O_5$ and $Bi_2O_3$, respectively. Thus, a catalyst particle weighing 5 grams and containing elemental vanadium, elemental bismuth, bismuth sulfide ($Bi_2S_3$), vanadium sulfide ($V_2S_5$), and bismuth orthovanadate ($BiVO_4$), each in a weight of 0.1 grams, contains vanadium components in a proportion of 5.52 weight percent as $V_2O_5$ and bismuth components in a proportion of 5.48 weight percent as $Bi_2O_3$.)

The following two Examples demonstrate preferred procedures for preparing catalysts useful in the invention.

EXAMPLE I

Four hundred twenty-one grams of 75% $SiO_2$-25% $Al_2O_3$ silica-alumina, commercially sold by the Davison Chemical Division of W. R. Grace & Co. as high alumina cracking catalyst, were placed in a steel muller to which was added 44.2 grams of ammonium metavanadate ($NH_4VO_3$) and 6 grams of powdered methylated cellulose. The mixture was mulled for 45 minutes. A solution was then prepared by dissolving 88.8 grams of bismuth nitrate ($Bi(NO_3)_3.5H_2O$) in a liquid consisting of 200 cc. water and 32 cc. concentrated nitric acid. The solution was added to the previously mulled mixture, and mulling was continued for 15 minutes. An extrudable paste was then formed by mulling with 71 cc. of water for 15 minutes. The resulting paste was then extruded through a 1/8 inch diameter die and out into particles having lengths between about 1/8 and 1/2 inch. The extrudates were then allowed to dry overnight at 230° F. The extrudates were then calcined in the presence of air at 932° F. for 2 hours. The resulting catalyst contained 9.1 weight percent vanadium components (as $V_2O_5$) and 11.2 weight percent bismuth components as $Bi_2O_3$. The catalyst contained an X-ray detectable proportion of bismuth orthovanadate.

EXAMPLE II

Sufficient ammonium metavanadate ($NH_4VO_3$) was mulled with the high alumina silica-alumina described in the preceding Example so that, after extrusion and cutting into 1/8 inch diameter by 1/16-1/2 inch cylindrical extrudates and calcination at a temperature of about 932° F. for 2 hours in air, the resulting product contained 10 weight percent vanadium components as $V_2O_5$. One hundred grams of such product were then contacted with a solution prepared by dissolving 35 grams of bismuth nitrate ($Bi(NO_3)_3.5H_2O$) in a mixture of 100 cc. water and 15 cc. concentrated nitric acid to which was added sufficient water to provide a solution of 120 cc. volume. The solution was allowed to contact the extrudate material for two hours to insure full impregnation. The extrudate material was then filtered, dried overnight at 230° F., and calcined at 932° F. for two hours in the presence of air. The resulting catalyst contained an X-ray detectable proportion of bismuth orthovanadate and further contained 8.63 weight percent vanadium components as $V_2O_5$ and 11.6 weight percent bismuth components as $Bi_2O_3$.

Catalysts prepared by the foregoing methods or their obvious equivalents have been found to be highly active for the gas phase oxidation of $H_2S$ to either $SO_2$, sulfur, or some percentage combination of both, as desired. In addition, such catalysts are remarkably stable in the presence of water vapor. Unlike vanadia catalysts, which are subject to deactivation when oxidizing $H_2S$ at temperatures below 600° F. and in the presence of water vapor at partial pressures of more than about 1.0 p.s.i.a., vanadium-bismuth catalysts prove highly resistant to deactivation when oxidizing $H_2S$ to sulfur and/or $SO_2$ in the presence of substantial water vapor, regardless of operating temperature. For example, the life of preferred vanadium-bismuth catalysts for oxidizing $H_2S$ at temperatures below about 600° F. and in the presence of water vapor at partial pressures ranging between about 1.5 and 10.0 p.s.i.a. is often at least 90 days, usually at least one year.

The present invention therefore provides an advantage over vanadia catalysts when $H_2S$ must be oxidized in the presence of water vapor at partial pressures above about 1.0 p.s.i.a., and the catalyst of the invention has been successfully used to treat a number of feed gases containing $H_2S$ and water vapor. In one experiment, a vanadium-bismuth catalyst proved useful for converting $H_2S$ to elemental sulfur by reaction with oxygen at a temperature of about 380° F. in the presence of water vapor at a partial pressure of about 9.0 p.s.i.a. In another, it was found that an alumina-supported vanadium-bismuth catalyst, containing about 10% by weight of each metal, calculated as $V_2O_5$ and $Bi_2O_3$, respectively, resisted deactivation even in the presence of water vapor at partial pressures exceeding 50 p.s.i.a. More specifically, essentially no deactivation resulted at 332° F. and 20,000 GHSV when $H_2S$, present in a concentration between 320 and 345 ppmw, was incinerated from a geothermal gas stream also containing water vapor at a partial pressure greater than 60 p.s.i.a. and a concentration by volume greater than 95 percent.

In addition, vanadium-bismuth catalysts are highly selective when oxidizing $H_2S$, conditions being readily found for converting $H_2S$ to sulfur and/or $SO_2$ at operating temperatures up to 900° F. without substantial formation of $SO_3$, even in the presence of excess oxygen. The catalyst is also selective for oxidizing $H_2S$ in the presence of $H_2$, CO, $NH_3$, and light hydrocarbons. It has been found, for example, when non-condensable gases obtained from geothermal steam, consisting essentially of 16.7 volume percent $H_2$, 1.4 volume percent $H_2S$, 12.7 volume percent $CH_4$, 38.8 volume percent $CO_2$, 4.4 volume percent $O_2$, 16.0 volume percent $N_2$, and 10.0 volume percent water, were subjected to incineration conditions of 3600 v/v/hr space velocity and varying temperatures between about 590° and 780° F. in the presence of a catalyst consisting essentially of 9.7 weight percent vanadium components, calculated as $V_2O_5$, and 11.2 weight percent bismuth components, calculated as $Bi_2O_3$, on a 75% $SiO_2$-25% $Al_2O_3$ support, that essentially full conversion of $H_2S$ to $SO_2$ is achieved without oxidizing essentially any methane while about 5% of the hydrogen was oxidized at a temperature of 590° F. and about 10% at 670° F. At higher temperatures, hydrogen consumption increased with increasing temperature, methane consumption remained nil, and essentially no $SO_3$ was formed.

The choice as to whether or not the $H_2S$ in a given gas stream is to be converted to elemental sulfur or $SO_2$ will most likely depend upon local air pollution regulations. Typically, the maximum concentration of $H_2S$ allowable for discharge to the atmosphere is about 10 ppmv while $SO_2$ may be discharged in a maximum concentration varying between about 500 ppmv and 2.0 vol.%. Hence, incineration, i.e., conversion of $H_2S$ to $SO_2$, will usually be directed to gas streams containing between about 10 ppmv and 2.0 vol.% $H_2S$, while the typical gas stream treated for conversion to elemental sulfur will contain at least about 500 ppmv $H_2S$, usually 500 ppmv to 10.0 vol.% $H_2S$, preferably 500 ppmv to 5.0 vol.% $H_2S$, and most preferably 500 ppmv to 2.0 vol.% $H_2S$.

Normally, the gas streams treated in the process of the invention contain, in addition to $H_2S$, any of such components as $N_2$, $CO_2$, CO, $H_2$, $SO_2$, $O_2$, Ar, $NH_3$, $H_2O$, and light hydrocarbons. Typical gas streams for treatment herein include such $H_2S$-containing gas streams as sour natural gases, off-gases derived from geothermal steam, and high temperature, gasified coal or gasified residual oil. The gas stream may also contain such sulfur-containing components as COS, $CS_2$, and light mercaptans (i.e., saturated mercaptans containing no more than six carbon atoms). If such sulfur-containing components are present, it is preferred that the gas stream be pretreated by the process disclosed in U.S. Pat. No. 3,752,877, herein incorporated by reference. According to this process, $CS_2$, COS, and light mercaptans, along with $SO_2$ if present, are simultaneously converted at elevated temperatures (usually 300° to 900° F.) to $H_2S$ by reaction with $H_2$ and/or water vapor in the presence of a catalyst comprising one or more active catalytic components of Co, Mo, Fe, W, Ni, with combinations of Co with Mo or Ni with Mo being most preferred. The pretreated gas stream will then contain $H_2S$ as essentially the only gaseous sulfur component and may be treated by a process described herein so that the $H_2S$ may be converted to $SO_2$ and/or elemental sulfur as desired.

A gas stream especially suited to the foregoing pretreatment method is a Claus tail gas. Other gas streams which are preferably pretreated prior to contact with the catalyst of the invention are those containing olefins or aromatics. Olefins deactivate the catalyst herein by forming gums that deposit on the catalyst surfaces, and aromatics such as benzene, when present in significant proportions, e.g., 100 ppmv, deactivate the catalyst when the operating temperature is below about 350° F. Both types of deactivation, however, are only temporary, the olefin deactivation being overcome by high temperature oxidation of the gum-containing catalyst and the aromatics deactivation by raising the operating temperature above 350° F. Alternatively and more preferably, gas streams containing aromatic or olefin components are pretreated so as to remove these deleterious components prior to contact with the catalyst of the invention. One such pretreatment method, particularly suitable for gas streams containing olefins, is catalytic hydrogenation under the conditions and with the catalyst hereinbefore specified for gas streams containing $SO_2$, $CS_2$, COS, and light mercaptans.

Gas streams to be treated by incineration should either contain sufficient oxygen or be blended with sufficient oxygen or air so as to provide at least the stoichiometric proportion required for:

$$2H_2S + 3O_2 \rightarrow 2SO_2 + 2H_2O. \tag{I}$$

More preferably, oxygen is present in a proportion in excess of stoichiometric, usually in a proportion between about 1.1 and 2.5 times the stoichiometric proportion. Other conditions usually employed in incinerating $H_2S$ in an adiabatic or isothermal reactor include (a) operating pressures between about 5 and 500 psia, with pressures of 15-75 psia being preferred, (b) inlet operating temperatures in the range of 250°-900° F., with temperatures below about 600° F. and especially below about 450° F. being preferred, and (c) space velocities between 100 and 50,000 v/v/hr, with 500-5000 v/v/hr being preferred. Operating conditions are appropriately adjusted so that at least 90% of the $H_2S$ is incinerated to $SO_2$. Preferably, the operating conditions are adjusted so that essentially all the $H_2S$ is incinerated Conditions known to produce essentially full conversion of $H_2S$ to $SO_2$ include: 450° F., 50 psig, 2000 v/v/hr (gas volume calculated at 60° F.), 2.2 times the stoichiometric proportion of air, and 2700 ppmv $H_2S$ in the feed gas. The following Example III demonstrates the suitability of these conditions.

EXAMPLE III

A feed gas stream having a composition shown in Table I was blended at a rate of 460 scc/min (gas volume measured at 60° F.) with water vapor fed at a rate of 40 scc/min and air fed at the rate of 19.8 scc/min. The resultant gas mixture, having a water vapor content of 7.7 vol.% and an oxygen content of about 0.80 vol.% (2.23 times stoichiometric) was then passed for 15 days at a pressure of 50 psig, a constant temperature of 450° F., and a space velocity of about 2000 v/v/hr through an isothermal catalytic reactor containing 15 cc. of catalyst particles comprising 11.6 weight percent bismuth components (as $Bi_2O_3$) and 8.6 weight percent vanadium components (as $V_2O_5$). The catalyst was prepared as described in Example II, and the water partial pressure within the reactor was about 5.0 psia. The product gas was analyzed on the 15th day by appropriate mass spectrometrical techniques, and the results are reported on an anhydrous basis in Table I. As shown, the $H_2S$ was completely converted to $SO_2$, and no $H_2$ or methane was oxidized. The $SO_3$ content of the effluent gas was determined to be from 3 to 5.0 ppm.

TABLE I

|  | Feed Composition | Product Composition |
| --- | --- | --- |
| Hydrogen | 873 ppmv | 838 ppmv |
| Methane | 1.68 vol. % | 1.60 vol. % |
| Nitrogen | 0 ppmv | 2.77 vol. % |
| Oxygen | 0 ppmv | 0.43 vol. % |
| Argon | 3 ppmv | 365 ppmv |
| Carbon Dioxide | 97.96 vol. % | 94.85 vol. % |
| Hydrogen Sulfide | 2717 ppmv | 0 ppmv |
| Methyl Mercaptan | 2 ppmv | 0 ppmv |
| Carbonyl Sulfide | 4 ppmv | 0 ppmv |
| Sulfur Dioxide | 36 ppmv | 2212 ppmv |
| Carbon Disulfide | 0 ppmv | 0 ppmv |
| Total Sulfur Compounds as $SO_2$[1] | 2759 ppmv | 2212 ppmv |

[1]Note:
The reason a lower concentration of total sulfur compounds was found in the product gas than in the feed was due to dilution by the blend of air oxidant and also by the fact that on the 15th day of operation the $H_2S$ concentration in the feed was somewhat lower than shown in Table I.

EXAMPLE IV

Six differently prepared catalysts were tested under the conditions of Example III to determine how active and stable they were for incinerating $H_2S$ in the presence of 5.0 psia water vapor pressure. The six catalysts were prepared as follows:

10 weight percent $V_2O_5$ on silica-alumina

A mixture of ammonium vanadate and the high alumina cracking catalyst described in Example I were mulled in the presence of sufficient water to create a paste suitable for extrusion. The paste was extruded through a ⅛ inch die, cut into pieces about 1/16-½ inch in length, dried at 230° F., and calcined in air at 932° F. for two hours. The catalyst consisted of 10 weight percent vanadium components (calculated as $V_2O_5$) and silica-alumina (75% silica-25% alumina).

36.6 weight percent $V_2O_5$ on silica-alumina

One hundred and eight grams of ammonium metavanadate, 291 grams of the high alumina silica-alumina described in Example I, and 7.74 grams of methylated cellulose were mulled in the presence of sufficient water to produce an extrudable paste. The paste was then extruded and cut into ⅛ inch diameter by 1/16-½ inch long cylindrical pieces. The extrudates were dried overnight at 230° F. and calcined at 932° F. for two hours in the presence of air. The catalyst so produced contained 36.6 weight percent vanadium components (calculated as $V_2O_5$) on silica-alumina (75% $SiO_2$-25% $Al_2O_3$).

10.2 weight percent $Bi_2O_3$ on alumina

This catalyst was prepared according to a method similar to that taught in Example I of U.S. Pat. No. 4,012,486. The procedure utilized was as follows: 17 gm $BiCl_3$ was dissolved in 40 cc. water to which was added 40 cc. concentrated hydrochloric acid. The solution was then diluted with 100 cc. water. The solution so produced was allowed to contact 100 grams of gamma alumina 1/16 inch diameter extrudates for two hours. The excess liquid was then decanted off, and the impregnated extrudates were washed with a solution consisting of 30% concentrated $NH_4OH$ and 70% water until the extrudates were chloride free. The extrudates were then washed with 500 cc. water and calcined for 2 hours at 932° F. The catalyst contained 10.2% bismuth components (calculated at $Bi_2O_3$) supported on gamma alumina.

4.5 weight percent $Bi_2O_3$-9.4 weight percent $V_2O_5$ on silica alumina

This catalyst was prepared by first preparing the 10 weight percent $V_2O_5$ on silica-alumina catalyst as described above. One hundred grams of this catalyst was contacted with a solution prepared by first dissolving 11.6 gm bismuth nitrate in 100 cc. water to which was added 5 cc. concentrated nitric acid, and then further adding sufficient water to make the solution up to 120 cc. The contacting time was 2 hours, after which the excess liquid was decanted off. The impregnated extrudes were then dried at 230° F. overnight and calcined for 2 hours at 932° F. in the presence of air. The finished catalyst contained 4.5 weight percent bismuth components (calculated as $Bi_2O_3$) and 9.4 weight percent vanadium components (calculated as $V_2O_5$). By X-ray diffraction analysis, it was determined that the finished catalyst contained bismuth orthovanadate.

7.95 weight percent $Bi_2O_3$-9.0 weight percent $V_2O_5$ on silica alumina

This catalyst was prepared according to the method shown above for the 4.5 weight percent $Bi_2O_3$-9.4 weight percent $V_2O_5$ catalyst except that the impregnating solution was prepared as follows: 23.2 gm bismuth nitrate were dissolved in 100 cc. of water plus 10 cc. nitric acid. The solution was then sufficiently diluted with water to provide a total volume of 120 cc. The finished catalyst contained 7.95 weight percent of bismuth components (as $Bi_2O_3$) and 9.0 weight percent vanadium components (as $V_2O_5$). The catalyst was found by X-ray diffraction analysis to contain bismuth orthovanadate.

11.6 weight percent $Bi_2O_3$-8.63 weight percent $V_2O_5$ on silica-alumina

The catalyst was prepared according to the method shown in Example II.

Each of the foregoing catalysts was utilized to incinerate $H_2S$ to $SO_2$ under the conditions recited in Example III. The only condition which was varied for the individual catalysts was operating temperature. After operating with the various catalysts for several days duration at temperatures varying between about 450° and 510° F., the stability of each catalyst was determined by comparing the concentration of unreacted $H_2S$ in a sample of the product gas at a specified operating temperature early in the run versus the concentration of unreacted $H_2S$ in a sample of the product gas produced at the same specified temperature later in the run. The data so obtained are tabulated in Table II, and the stabilities of the various catalysts, in terms of the increase of unreacted $H_2S$ in the product gas per day, are also tabulated in Table II. As shown, the catalysts which proved most stable were those consisting of bismuth components or bismuth and vanadium components as the essential active catalytic components. Catalysts containing only vanadium components as the essential active catalytic components deactivated at unacceptably high rates. The most stable catalysts were those containing bismuth and vanadium components in proportions of at least about 8.0 weight percent and 7.0 weight percent, respectively. Such catalysts proved remarkably more stable than the 10% or 36.6% $V_2O_5$ catalyst and roughly twice as stable as the 10.2% $Bi_2O_3$ catalyst.

Also significant is the fact that the two catalysts containing at least about 8.0 weight percent bismuth components and at least about 7.0 weight percent vanadium components maintained an $H_2S$ concentration in the product below about 3.5 ppmv in comparison to about 6 ppmv for the vanadium-bismuth catalyst containing only 4.5 weight percent bismuth. Many environmental regulations permit no more than about 10 ppmv of $H_2S$ to be discharged to the atmosphere and it can be seen that the two vanadium-bismuth catalysts containing at least about 8.0 weight percent bismuth components provide activity and stability that will insure against reaching such high levels of $H_2S$ in the product gas whereas the 4.5 weight percent bismuth-9.4 weight percent vanadium catalyst is less suitable for this purpose. Of special note is the high stability of the 11.6 weight percent bismuth-8.63 weight percent vanadium catalyst. Because of the high stability and high activity of this catalyst, it and other catalysts containing at least 10 weight percent bismuth components, calculated as $Bi_2O_3$, and at least 8.0 weight percent vanadium components, calculated as $V_2O_5$, are most highly preferred in the invention.

TABLE II

| Catalyst | ppmv $H_2S$ in Product at Time, $t_1$ | ppmv $H_2S$ in Product at Time, $t_2$ | Operating Temperature, °F. | $t_2$-$t_1$ Days | Deactivation Rate[1] $H_2S$/day |
|---|---|---|---|---|---|
| 10% $V_2O_5$ | 1.5 | 46.8 | 500 | 7.5 | 6.04 |
| 36.6% $V_2O_5$ | 1.5 | 51.5 | ~450 | 16.9 | 2.96 |
| 10.2% $Bi_2O_3$ | 3.3 | 12.2 | 510 | 14.1 | 0.63 |
| 4.5% $Bi_2O_3$—9.4% $V_2O_5$ | 2.9 | 6.0 | 450 | 9.9 | 0.31 |
| 7.95% $Bi_2O_3$—9.0% $V_2O_5$ | 1.4 | 3.5 | 450 | 6.0 | 0.35 |
| 11.6% $Bi_2O_3$—8.63% $V_2O_5$ | 0.5 | 3.0 | 450 | 11.0 | 0.23 |

[1]Deactivation Rate = (ppmv $H_2S$ in product at $t_2$ - ppmv $H_2S$ in product at $t_1$) ÷ ($t_2$-$t_1$) days.

EXAMPLE V

To compare the initial activities of the catalysts of the invention against vanadia catalysts and bismuth catalysts, data comparing the product $H_2S$ obtained at various temperatures in the runs of Example IV prior to any significant catalyst deactivation were tabulated in Table III. Also tabulated in Table III are data obtained from an experiment run under the same conditions of Example III but using a catalyst consisting of 13.0 weight percent $Bi_2O_3$ and silica-alumina (75% $SiO_2$-25% $Al_2O_3$), which catalyst was prepared by impregnating silica-alumina extrudates with a bismuth nitrate solution followed by calcination at 932° F. for two hours in the presence of air.

As shown in Table III, the vanadia and vanadium-bismuth catalysts had activities yielding similar results under the conditions of the experiment, i.e, both catalysts left almost no unreacted $H_2S$ at temperatures in the 420° to 450° F. range. On the other hand, the 10.2% and 13.0% bismuth catalysts were only useful at temperatures above about 500° F. for providing a product nearly free of unreacted $H_2S$. At temperatures in the 490° to 500° F. range, the two bismuth catalysts both showed evidence of loss of activity, with unreacted $H_2S$ being as high as 50 ppmv. Thus, the vanadia and vanadium-bismuth catalysts exhibited substantially better activity for the conversion of $H_2S$ to $SO_2$ than the catalysts containing only bismuth components as the essential active catalytic components.

TABLE III

| Catalyst | Temperature, °F. | ppmv $H_2S$ |
|---|---|---|
| 10% $V_2O_5$ | 445 | 4.4 |
| | 490 | 3.4 |
| | 500 | 1.5 |
| 36.6% $V_2O_5$ | 400 | 25 |
| | 410 | 17 |
| | 420 | 4.8 |
| | 440 | 1.5 |
| 10.2% $Bi_2O_3$ | 500 | 50 |
| | 510 | 11.8-13.4 |
| | 520 | 3.3-8.6 |
| | 530 | 3.6 |
| 13.0% $Bi_2O_3$ | 490 | 17.1 |
| | 500 | ~1.0 |
| | 510 | 0.9 |
| 4.5% $Bi_2O_3$—9.4% $V_2O_5$ | 440-450° F. | 1.7-6.0 |
| 7.95% $Bi_2O_3$—9.0% $V_2O_5$ | 450-460° F. | 1.1-3.5 |
| 11.6% $Bi_2O_3$—8.63% $V_2O_5$ | 450-470° F. | 0.3-4.5 |

Because the data shown in Table III were obtained from a laboratory experiment using only about 15 cc of catalyst in an isothermal reactor vessel, the conditions of operation, and particularly the use of temperatures above 400° F., were not conducive to distinguishing the difference in catalytic activity between vanadia catalysts and vanadium-bismuth catalysts for the oxidation of $H_2S$ to $SO_2$. As the data in Table III show, both catalysts under the conditions of the experiment drive the conversion to $SO_2$ essentially to completion at temperatures above about 420° F., and thus, to distinguish the activities of the two catalysts, a second experiment was performed under adiabatic conditions with much larger volumes of catalyst and at temperatures below 400° F. In this experiment, which is more fully described in the following Example VI, the vanadia and vanadium-bismuth catalysts are seen to have strikingly different catalytic activities for incinerating $H_2S$.

EXAMPLE VI

A sample (1865 cc) of cylindrical particulates (⅛ inch diameter) of a vanadium-bismuth catalyst consisting essentially of 7.9 weight percent vanadium components, calculated as $V_2O_5$, and 9.0 weight percent bismuth components, calculated as $Bi_2O_3$, on a support consisting essentially of 75% $SiO_2$ and 25% $Al_2O_3$ was charged to a reactor vessel of pilot plant size. This catalyst, which had a surface area of 330 m²/gm, a pore volume of 0.64 cc/gm, and a compacted bulk density of 0.65 g/cc, had previously been used over a 118-day time period for oxidizing $H_2S$ in various experiments; the catalyst was, therefore, not fresh catalyst but was subjected to an activation treatment with air at 400° F. prior to the test run now to be described.

A gas stream consisting essentially of 1 volume percent $H_2S$, 7 volume percent water vapor, 18.5 volume percent air (providing 2.59 times the oxygen necessary for complete conversion to $SO_2$) and the balance being $CO_2$ was passed through the reactor vessel at a gas hourly space velocity of 2,000 v/v/hr and an inlet pressure between about 25 to 30 p.s.i.a. and an outlet pressure between about 15 and 20 p.s.i.a. The reactor was operated under simulated adiabatic conditions, that is, the only heat introduced to the reactor vessel was that which would make up for losses due to inadequate insulation and the like.

Operating in the foregoing manner, and at 340° F. inlet temperature, essentially complete conversion of $H_2S$ to $SO_2$ was obtained, as determined by the absence of sulfur formation in the piping conduits carrying the product gases. Had substantial $H_2S$ been present, elemental sulfur would have formed by the reaction of product $SO_2$ with unreacted $H_2S$ and deposited by condensation in the product piping conduits.

The reactor vessel was subsequently charged with 1865 cc. of ⅛ inch diameter particles of vanadia catalyst consisting essentially of 9.12 weight percent vanadium components, calculated as $V_2O_5$, on a silica-alumina (25% alumina) support, said catalyst having a surface area of 340 m²/gm and a compacted bulk density of 0.53 gm/cc. This catalyst had only been in use for five days for various $H_2S$ oxidation experiments, and thus was essentially fresh catalyst. But to be certain that the catalyst was in a fully oxidized form, it was activated using air at 700° F.

The vanadia catalyst was used under the same operating pressure and gas hourly space velocity conditions as for the vanadium-bismuth catalyst, but the composition of the gas stream contained substantially more oxygen. More specifically, the composition of the gas stream was as follows: 1 volume percent $H_2S$, 7 volume percent water vapor, 48 volume percent air (providing 6.72 times the amount of oxygen for full reaction to $SO_2$, compared to only 2.59 times the necessary amount in the run using the vanadium-bismuth catalyst), and the balance $CO_2$.

Due to the greater proportion of oxygen in the feed gas of the second run compared to the first, the conditions for producing $SO_2$ with the vanadia catalyst were far more favorable than were those used with the vanadium-bismuth catalyst. But despite this decided advantage, the vanadia catalyst proved far less active for incinerating $H_2S$. Essentially complete conversion to $SO_2$, as determined by the absence of sulfur formation in the product piping conduits, could not be achieved at inlet temperatures throughout the 370° to 400° F. range. These inlet temperature conditions consistently yielded large sulfur deposits in the product piping under simulated adiabatic conditions. Only with non-adiabatic conditions, when heat above that required for adiabatic conditions was added to the reactor vessel, could the conversion to $SO_2$ be maintained without sulfur deposition at inlet temperatures of 370° to 400° F.

From the results of the foregoing comparative experiment, it was concluded that the vanadium-bismuth catalyst was a more active catalyst than the vanadia catalyst for incinerating $H_2S$ by virtue of the fact that essentially complete conversion was obtained at an inlet temperature of only 340° F. whereas the vanadia catalyst, under more favorable oxygen conditions, could not drive the conversion to completion at the higher temperatures of 370° to 400° F. The catalyst of the invention, therefore, was determined to be substantially more active than the vanadia catalyst for oxidizing $H_2S$ to $SO_2$.

The catalyst of the invention may also be utilized to oxidize $H_2S$ to elemental sulfur as well as to $SO_2$. To produce elemental sulfur, conditions are usually chosen for adiabatic or isothermal reactors from the following ranges: 250° to 900° F., 100 to 10,000 v/v/hr, and 5 to 75 p.s.i.a. Typical space velocity and pressure conditions fall in the ranges of 100 to 10,000 v/v/hr and 5 to 75 p.s.i.a., respectively, with space velocities of 500 to 1500 v/v/hr and pressures of 15 to 20 p.s.i.a being among the conditions most often employed. Operating temperature is of importance in the process, for the conversion to sulfur in the gas phase is dramatically affected by temperature, the sulfur yield increasing with decreasing temperature below about 1000° F. On the other hand, if the operating temperature drops below the sulfur vapor dew point, then sulfur may condense on the catalyst, which, although easily removable by raising the temperature, is an inconvenience usually to be avoided. Taking the foregoing into consideration, the temperatures chosen for operation to maximize the yield to sulfur are below about 475° F., especially below about 450° F., while temperatures below about 250° F., although contemplated as operative with the preferred catalyst of the invention, are generally avoided due to increasing problems with sulfur condensation. Sulfur begins to condense at about 260° F. under atmospheric pressure, and to operate without sulfur deposition under pressure conditions around atmospheric, the temperature must be maintained above 260° F., as for example, by maintaining the temperature of reaction at or above 275° F.

Because of the high activity of the catalyst of the invention, relatively low temperatures of initiation may be employed, which, in addition to aiding in maximizing the yield of sulfur, also reduces the amount of preheating required to treat relatively low temperature H₂S-containing feed gases, thereby saving on energy costs. Of course, the minimum temperature at which ignition will commence varies according to the nature of the feed gas, the catalyst selected, the space velocity, and other factors, but in the usual instance, a temperature of initiation at least below 400° F. is employed, with progressively lower temperatures, as for example below 350° F., below 325° F., below 300° F., and down to the usual minimum temperature of operation under atmospheric pressure conditions, i.e., 275° F., progressively taking greater and greater advantage of the superior activity and other properties of the catalyst of the invention.

The conversion of H₂S to sulfur also requires an oxidant gas, and one suitable oxidant gas, oxygen, usually supplied in the form of air, is blended with the feed gas stream containing the H₂S so as to produce sulfur vapor according to the following reaction:

$$2H_2S + O_2 \rightarrow 3S + 2H_2O \qquad (II)$$

Most preferably, the amount of air or oxygen so blended with the feed gas is such that oxygen is present in a proportion near or at the stoichiometric proportion for Reaction (II), usually between about 0.9 and 1.1 times the stoichiometric proportion. As is well known, the highest possible conversions of H₂S to sulfur are accomplished when oxygen is available in its stoichiometric proportion. Also contributing to high sulfur yields are low water vapor partial pressures and, as stated hereinbefore, relatively low operating temperatures.

It is, of course, well known that SO₂ may be used in place of oxygen for the conversion of H₂S to sulfur, the sulfur being formed by the following equation:

$$2H_2S + SO_2 \rightarrow 3S + 2H_2O \qquad (III)$$

Thus, if SO₂ is present in the feed gas stream in any H₂S to SO₂ ratio greater than 2.0, oxygen need only be added in an amount sufficient to react with the H₂S not converted by Reaction (III). In other words, if the ratio of H₂S to SO₂ is greater than 2.0, then the stoichiometric proportion of oxygen is that proportion sufficient to provide a molar or volumetric ratio of H₂S to (SO₂+O₂) equal to 2.0.

For feed gases inherently containing H₂S and SO₂ in an H₂S-to-SO₂ ratio less than 2.0, the highest possible conversions to sulfur are obtained by firstly pretreating the feed so as to convert the SO₂ to H₂S, as by the method shown hereinbefore in U.S. Pat. No. 3,752,877, and then blending the pretreated gas with sufficient oxygen or air to provide an H₂S to O₂ ratio equal to 2.0. For feed gases containing H₂S to SO₂ in a ratio equal to 2.0, no pretreatment or addition of oxygen is necessary; the catalyst may be used for the direct conversion of H₂S to sulfur via Reaction (III).

In view of the foregoing, it should be apparent that, when elemental sulfur is desired, SO₂ may be utilized as an alternative oxidant to oxygen. That is, for any gas stream containing H₂S, elemental sulfur may be produced herein by blending either SO₂ or oxygen oxidant with the gas stream such that a ratio of H₂S to oxidant of 2.0 is provided. However, oxygen is inherently superior to SO₂, not only because of its ready availability in the form of air but also due to the higher conversions to sulfur obtainable therewith. A comparison of Reactions (II) and (III) reveals that, for the same amount of H₂S converted to sulfur, 50% more sulfur is formed by Reaction (III) with SO₂ oxidant than by Reaction (II) with O₂ oxidant. The formation of 50% more sulfur by Reaction (III) necessitates higher operating temperatures for Reaction (III) than for Reaction (II) if the sulfur vapor dew point is not to be exceeded. But at operating temperatures below 1000° F., the conversion of H₂S to sulfur decreases with increasing temperature. Thus, because H₂S can be converted to sulfur by Reaction (II) at a lower temperature than Reaction (III) without exceeding the dew point, an inherent advantage—i.e., a higher conversion—is obtained when oxygen is used as oxidant than when SO₂ is utilized.

Whether oxygen or SO₂ is utilized as oxidant, it will be found that the catalyst of the invention is highly useful for converting H₂S to elemental sulfur. The percentage conversion in any given situation, of course, will depend upon such factors as operating temperature, operating pressure, water vapor partial pressure, and choice of oxidant. But the vanadium-bismuth catalysts disclosed hereinbefore usually provide a conversion of H₂S to elemental sulfur within 10%, often within 5%, of theoretical. And because of their high activity for converting H₂S to sulfur, the vanadium-bismuth catalyst of the invention provides high conversions of H₂S to sulfur under lower operating temperature and/or higher space velocity conditions than are required for typical vanadia catalysts, disclosed, for example, in U.S. Pat. No. 4,243,647.

The following Example demonstrates the high activity of vanadium-bismuth catalysts for oxidizing H₂S to elemental sulfur.

EXAMPLE VII

A catalyst was prepared containing 8.7 weight percent vanadium components, calculated as V₂O₅, and 12.9 weight percent bismuth components, calculated as Bi₂O₃, and the balance being a support consisting of silica-alumina having a 25% by weight alumina content. The catalyst was in particulate form, had a surface area of 239 m²/gm, and a compact bulk density of 0.67 g/cc. (This catalyst was prepared in a manner very similar to that described in Example II.)

The foregoing catalyst (950 gm) was charged to an isothermal reactor and utilized to treat a feed gas containing (on an anhydrous basis) about 99% CO₂ and H₂S in a concentration varying between about 750 ppmv and 1200 ppmv. Air was blended with the feed gas such that stoichiometric oxygen was available within a 10% tolerance to oxidize the H₂S in the feed gas to sulfur. Elemental sulfur produced in the reactor was removed therefrom in the vapor form and recovered by condensation. The experiment was conducted over a time period of more than five months, and the data shown in Table IV were derived from analyses of samples of the feed and product gases when the operating conditions were those shown in Table IV.

It is noted with respect to the foregoing experiment that the catalyst throughout the run evinced no deactivation, except when the operating temperature fell below the sulfur vapor dew point temperature and sulfur deposited on the catalyst. Such deactivations, however, were only temporary, elevated temperatures restoring the catalyst to full activity.

TABLE IV

| Sample No. | 809 | 1232 | 1520 | 1544 | 1568 | 1716 | 1764 | 2130 | 2150 | 2322 |
|---|---|---|---|---|---|---|---|---|---|---|
| Water Vapor Pressure, psia | 3 | 3 | 3 | 3 | 3 | 5 | 5 | 5 | 2.5 | 5.0 |
| Operating Pressure, psia | 300 | 300 | 300 | 300 | 300 | 300 | 300 | 300 | 150 | 300 |
| Operating Temperatue, °F. | 381 | 334 | 305 | 295 | 285 | 310 | 300 | 410 | 410 | 410 |
| Feed $H_2S$, ppmv | 1050 | 1050 | 352 | 875 | 875 | 780 | 890 | 1132 | 1032 | 1137 |
| Product $H_2S$, ppmv | 68 | 48 | 44 | 29 | 84 | 111 | 120 | 143 | 213 | 162 |
| Product $SO_2$, ppmv | 88 | 45 | 47 | 73 | 25 | 40 | 62 | 65 | 64 | 86 |
| Sulfur Yield, % | 77.7 | 83.8 | 82.3 | 81.3 | 77.4 | 75.4 | 75.7 | 77.0 | 70.4 | 68.7 |
| GHSV (at 60° F. and 1 atm) | 750 | 750 | 750 | 750 | 750 | 750 | 750 | 750 | 750 | 975 |

One surprising aspect of the invention envidenced by the data in Table IV is the high stability of the vanadium-bismuth catalyst in the presence of water vapor. As shown previously by the data in Table II, vanadia catalysts deactivate rapidly in the presence of water vapor at temperatures below about 600° F., but the data in Table IV show that vanadium-bismuth catalysts resist such deactivation, even when utilized in the presence of water vapor at a partial pressure of 2.5 to 5.0 p.s.i.a. for a time period greater than five months.

Another surprising aspect of the invention revealed by the data in Table V is that the vanadium-bismuth catalyst is active for lighting off the conversion of $H_2S$ to sulfur at temperatures well below 300° F. This result is considered surprising for a number of reasons, not the least of which is that vanadia catalysts, which are known to be highly active for converting $H_2S$ to elemental sulfur, are nevertheless less active than vanadium-bismuth catalysts for lighting off the oxidation of $H_2S$ to sulfur. As will now be shown in the following Example VIII, vanadium-bismuth catalysts are far more active for oxidizing $H_2S$ to elemental sulfur and initiate the oxidation of $H_2S$ to sulfur at a much lower temperature than is the case for a vanadia catalyst treating the same feed gas-oxidant blend.

EXAMPLE VIII

In this Example, an experiment is described wherein the light-off characteristics of a vanadium-bismuth catalyst and a vanadia catalyst are compared for the oxidation of $H_2S$ to sulfur.

Two catalysts were prepared, both with supports consisting essentially of silica-alumina (75% $SiO_2$ and 25% $Al_2O_3$). The first catalyst, the vanadia catalyst, contained 16.4 weight percent vanadium components, calculated as $V_2O_5$, while the second contained 9.7 weight percent vanadium components, calculated as $V_2O_5$, and 11.2 weight percent bismuth components, calculated as $Bi_2O_3$. Both catalysts were prepared in an air-calcined form.

The catalysts were placed into separate but essentially identical reactor vessels and then tested simultaneously in a parallel operational mode to determine, with an identical feed gas treated under essentially identical conditions of pressure and weight hourly space velocity, the difference between the two catalysts with respect to kindling the reaction of $H_2S$ to sulfur using oxygen oxidant. The feed gas-oxidant blend was produced by mixing $H_2S$ at a rate of 39.60 scc/min with air flowing at 94.28 scc/min and nitrogen at 1845.82 scc/min, thereby providing a feed gas-oxidant gas stream flowing at a rate of 1979.70 scc/min and consisting essentially of 2.0 mole percent $H_2S$, 1.0 mole percent free oxygen, and about 97.0 mole percent nitrogen. Through use of independent control valves, the flow rate of the gas stream into each reactor vessel was maintained as closely as possible to identical rates of about 989.85 scc/min, and the operating pressure maintained in both reactor vessels was about 14.7 p.s.i.a.

The catalysts were employed in the experiment in identical amounts on a weight basis, i.e., 1.50 grams, although, due to density differences, the volumetric amount of the vanadium-bismuth catalyst employed was only 2.0 cc. in comparison to 3.0 cc. for the vanadia catalyst. Thus, both catalysts were employed under essentially identical space velocity conditions as determined by catalyst weight, i.e., 39,515 volumes of gas (in cubic centimeters) per gram of catalyst per hour, but on a volumetric basis, the gas hourly rate for the vanadium-bismuth catalyst was 1.5 times greater than that of the vanadia catalyst. More specifically, the volumetric space velocity for the vanadia catalyst was only about 19,797 v/v/hr as compared to 29,695.5 v/v/hr for the vanadium-bismuth catalyst.

The two reactor vessels were initially maintained at an operating temperature of about 265° F., in large part because a lower temperature would result in sulfur deposition and possible pluggage of the operating equipment. The product gas streams were then analyzed to determine if either catalyst exhibited activity for oxidizing $H_2S$ at 265° F. under the conditions specified above, which conditions included an $H_2S$ to $O_2$ ratio in the feed gas-oxidant blend maintained at the stoichiometric value for the conversion to sulfur. However, due to the analytical difficulty involved in measuring sulfur vapor in a gas stream, and because some $SO_2$ would concomitantly form under light-off conditions also producing sulfur, the product gas was analyzed for the presence of $SO_2$. At the initial operating temperature of 265° F., no $SO_2$ was detected in the product gas recovered from the reactor containing the vanadia catalyst, but that from the reactor containing the vanadium-bismuth catalyst yielded 536 ppmv of $SO_2$. It was thus determined that, under the conditions of the experiment, the light-off temperature for the vanadium-bismuth catalyst was below about 265° F. As to the vanadia catalyst, incremental increases in the operating temperature eventually resulted in a 2 to 3 ppmv breakthrough of $SO_2$ at 318° F., with 473 ppmv being produced at 370° F. and 609 ppmv being produced at 390° F.

The results of the experiment establish that the vanadium-bismuth catalyst of the invention ignites the reaction of $H_2S$ to sulfur at a lower temperature than that for the vanadia catalyst, the vanadia catalyst initiating no reaction whatever until the operating temperature was 53° F. higher than the 265° F. temperature at which the vanadium-bismuth catalyst proved highly active. And based on the data obtained at 265°, 370°, and 390° F., the vanadia catalyst required an operating temperature some 105° to 125° F. greater than that for the vanadium-bismuth catalyst to provide a comparable product.

The results of the experiment are all the more indicative of the superiority of the vanadium-bismuth catalyst when it is taken into account that the procedure of the experiment was, if anything, more favorable to the vanadia catalyst. In this regard, it is noted that, by volume, 50% more vanadia catalyst was utilized, so that the volumetric space velocity for the vanadia catalyst was only two-thirds of that for the vanadium-bismuth catalyst. In addition, although the vanadium-bismuth catalyst had somewhat more metals thereon by weight, due to the relatively high atomic weight of bismuth, actually had less total atoms of active metals thereon. More specifically, the vanadia catalyst contained 1.80 millimoles of vanadium (as the metal) per gram of catalyst whereas the vanadium-bismuth catalyst contained only 1.55 millimoles of total vanadium and bismuth (as the metals) per gram; yet the vanadium-bismuth catalyst proved highly superior to the vanadia catalyst.

In a specific embodiment of the invention particularly useful for treating feed gas streams containing between about 5 and 40 volume percent $H_2S$, especially when the feed gas stream contains water vapor at relatively high partial pressures, e.g., above about 2.0 p.s.i.a. and, more usually; above about 4.0 p.s.i.a., the feed gas stream is blended with air, preferably in a stoichiometric amount, and the resulting blended gases are passed through an adiabatic reactor containing a particulate vanadium-bismuth catalyst under conditions described hereinbefore such that a substantial proportion of the $H_2S$ is converted to elemental sulfur vapor. The product gas containing elemental sulfur is passed to a sulfur condenser or other suitable means for separating sulfur from the product gas, leaving a purified product gas containing residual $H_2S$. A portion of the purified product gas is then recycled and blended with the feed gas such that the blend of feed gas, air, and recycle gas entering the reactor contains $H_2S$ in a predetermined range, such as 3 to 6 volume percent, or below a predetermined maximum, typically and preferably, 5 volume percent. The remaining portion of the purified product gas is treated by any of three methods. The three methods (which are applicable to any embodiment of the invention in which the $H_2S$ content of a gas stream recovered after treatment with the vanadium-bismuth catalyst is too high for discharge to the atmosphere) are:

(1) If the $H_2S$ to $SO_2$ volumetric ratio in the purified product gas stream is about 2.0, this gas stream may be contacted with any porous refractory oxide-containing catalyst, such as alumina, under conditions of elevated temperature, e.g., 400° to 900° F., such that a substantial proportion of the $H_2S$ is converted by Reaction (III) to elemental sulfur, which is then recovered, as by condensation. In this embodiment of the invention, it will usually be found that an alumina catalyst will provide sufficient activity for oxidizing the $H_2S$ in the purified product gas stream to sulfur. But if higher activity is desired, vanadia catalysts, such as those described in U.S. Pat. No. 4,243,647, may be employed, as may vanadium-bismuth catalysts of the present invention if yet higher activity is desired. One advantage of a catalyst of increased activity is that the same conversion of $H_2S$ may be accomplished but under less favorable operating conditions, as for example, a lower operating temperature or a higher space velocity.

(2) If the $H_2S$ to $SO_2$ volumetric ratio of the purified product gas is substantially above 2.0, or if one desires to allow for fluctuations in the $H_2S$ to $SO_2$ ratio, then the purified product gas is treated in accordance with another embodiment of the invention by blending sufficient air to provide a volumetric ratio of $H_2S/(SO_2+O_2)$ of about 2.0 and contacting the resulting mixed gases with a vanadium-bismuth catalyst under conditions hereinbefore disclosed for conversion to elemental sulfur. In this embodiment of the invention, an alumina catalyst would not be a suitable choice for an alternative or substitute catalyst to vanadium-bismuth catalysts, the reaction of $H_2S$ with oxygen to produce sulfur not being readily promoted by alumina catalysts. However, a vanadia catalyst, for example, a catalyst consisting essentially of one or more vanadium oxides or sulfides on a porous refractory oxide support, may be substituted to treat the purified product gas, provided one is willing to tolerate lower catalytic activity. The lower activity may be considered acceptable in certain instances, as for example, if the cost of the catalyst is of special importance. But if the vanadia catalyst is utilized, not only will lower activity result, but the catalyst becomes subject to deactivation when the water vapor partial pressure is more than about 1.0 p.s.i.a. and the operating temperature is below about 600° F., the deactivation rate increasing with increasing water vapor partial pressures above 1.0 p.s.i.a.

(3) If the $H_2S$ content of either the purified product gas stream or the gas streams recovered after sulfur condensation from methods (1) and (2) above is too high for discharge to the atmosphere, but such gas streams could be discharged to the atmosphere if the $H_2S$ were converted to $SO_2$ (due to less stringent air pollution standards for $SO_2$ than for $H_2S$), such gas streams are subjected to incineration to convert the $H_2S$ therein to $SO_2$. The incineration may be accomplished thermally at temperatures above about 1000° F. in the presence of excess oxygen, but it is preferred that the incineration be accomplished catalytically by contact with the vanadium-bismuth catalyst of the invention as described hereinbefore under the range of conditions for conversion to $SO_2$ as also described hereinbefore. Use of the vanadium-bismuth catalyst provides a distinct advantage over thermal incineration in that the gas stream to be treated does not require as much preheating, the vanadium-bismuth catalyst being active for the conversion of $H_2S$ to $SO_2$ at temperatures substantially below 500° F. For example, it has been found that the vanadium-bismuth catalyst described in Example VI is effective for oxidizing $H_2S$ to $SO_2$ using excess oxygen at temperatures of 300° to 310° F., and the data obtained in the experiment of Example VIII, although conducted under partial oxidizing conditions for the production of elemental sulfur, indicate that yet lower temperatures, at or below 265° F., initiate conversion to $SO_2$.

Treating $H_2S$-containing feed gas streams in accordance with one or more of the foregoing embodiments proves highly effective for removing $H_2S$ and recovering sulfur. As an illustration, in one embodiment of the invention, a gas stream containing about 13 volume percent $H_2S$ is diluted with recycle gas so as to reduce the $H_2S$ concentration to 5 volume percent, and the resultant blend is than passed serially through four catalyst chambers, the first containing vanadium and bismuth components supported on silica-alumina, the second and third containing alumina catalysts, and the final one containing another catalyst of vanadium and bismuth on silica-alumina. In the first chamber, the $H_2S$ is oxidized with added air to elemental sulfur, which is separated by condensation from a purified product gas stream. In the second and third chambers, unreacted H$_2$S and SO$_2$ produced in the first chamber react to produce yet more sulfur, the sulfur being removed from the effluents of each chamber by condensation. Passage of remaining gases through the final catalyst chamber under incineration conditions converts residual H$_2$S to SO$_2$, and, overall, over 95%, usually about 97%, of the sulfur carried with the feed gas in the form of H$_2$S is recovered as elemental sulfur, and less than about 5% is discharged from the incinerator to the atmosphere in the form of SO$_2$.

In yet another specific embodiment of the invention, a catalyst is employed containing a silicalite or other crystalline hydrophobic support, preferably in combination with amorphous silica, for example, in a weight ratio to silicalite of 1 to 4, amorphous silica to silicalite. (As defined hereinbefore, a material is hydrophobic if it is capable of absorbing no more than about 0.5 cc. (i.e., 0.5 gm.) of water per gram, but the preferred hydrophobic material, in its anhydrous form, will sorb even less, e.g., no more than 0.05 gm. of water per gram when the ratio of the water vapor partial pressure at 25° C. to the water saturation pressure at 25° C. is 0.8.) Silicalite, of course, is the preferred crystalline hydrophobic material for use in the invention, but others contemplated are the aluminosilicate crystalline zeolites having unusually low water sorption properties, for example, LZ-10 zeolite, which is disclosed in U.S. Pat. No. 4,419,271, herein incorporated by reference in its entirety. LZ-10 zeolite is the same or similar to the UHP-Y zeolite disclosed in U.S. Pat. No. 4,401,556, also incorporated by reference in its entirety. According to this reference, UHP-Y zeolite is defined as a zeolite having a SiO$_2$/Al$_2$O$_3$ molar ratio of from 4.5 to 35, the essential X-ray diffraction pattern of zeolite Y, an ion exchange capacity of not greater than 0.070, a unit cell dimension $a_o$ of from 24.20 to 24.45 Å, a surface area of at least 350 m$^2$/gm (B-E-T), a sorptive capacity for water vapor at 25° C. and a $p/p^*$ of 0.10 of less than 5.00 weight percent and a Residual Butanol Test value of not more than 0.40 weight percent. When used in the supports of the catalysts herein, such hydrophobic materials are contemplated to partially or completely overcome the thermodynamic equilibrium limitations of the gas phase conversion to sulfur by either Reaction (II) or (III) hereinbefore presented. The active component used with such a support may be any of those known to be effective for oxidizing H$_2$S to sulfur in the gas phase, such as vanadium, vanadium oxides, vanadium sulfides, iron, iron oxide, and the like, which will generally be present in the catalyst in a proportion of at least 5 percent by weight. Other catalytic components useful for the oxidation of hydrogen sulfide to sulfur, particularly when further combined with one or more vanadium components, are tin, bismuth, and antimony and the compounds thereof, particularly the oxides and sulfides. Particularly effective, of course, will be the active component of the present invention, i.e., the combination of vanadium and bismuth as hereinbefore discussed; such catalysts will not only benefit by the hydrophobic properties of the support to aid in overcoming equilibrium limitations, but also by the higher activity of vanadium and bismuth for promoting the conversion of H$_2$S to sulfur.

The hydrophobic catalysts prepared from the hydrophobic support are contemplated as especially useful for oxidizing hydrogen sulfide to elemental sulfur in gas streams, such as those derived from geothermal steam. Such streams ordinarily contain water vapor in relatively high concentrations, so that, in the absence of the present catalyst, the yield according to either Reaction (II) or Reaction (III) would be severely limited. But in the presence of the present catalyst, it is believed that the equilibrium limitations of Reactions (II) and/or (III) can be overcome, at least in part, so as to give a higher yield of sulfur than expected from thermodynamic calculations.

Although the invention has been described in conjunction with specific examples and embodiments thereof, it is evident that many alterations, modifications, and variations will be apparent to those skilled in the art in light of the foregoing description. For example, it should be self-evident that the catalytic process of the invention may easily be modified to oxidize H$_2$S to any desired percentage combination of sulfur and SO$_2$ by simply controlling the proportion of oxygen between the amount required for Reaction (I) and that required for Reaction (II). Also, although the examples herein employed a catalyst in a fixed bed reactor, other operating conditions are also contemplated, for example, fluidized conditions, which may prove especially advantageous for the conversion of H$_2$S to sulfur. Accordingly, it is intended in the invention to embrace these and all such alternatives, modifications, and variations as may fall within the spirit and scope of the appended claims.

We claim:

1. A process for oxidizing hydrogen sulfide comprising contacting hydrogen sulfide and an oxidant gas comprising a component selected from the group consisting of sulfur dioxide and oxygen with a catalyst comprising a vanadium component in combination with a component of bismuth, tin, or antimony on a support containing a crystalline material selected from the group consisting of a crystalline silica molecular sieve or a crystalline zeolite, said silica or zeolite having a water sorption capacity of no more than 0.05 gram of water per anhydrous gram of crystalline material when the ratio of the water vapor partial pressure at 25° C. to the water saturation pressure at 25° C. is 0.8, under conditions causing said hydrogen sulfide to react with said component to produce elemental sulfur.

2. A process as defined in claim 1 wherein said material comprises a crystalline, molecular sieve silica polymorph.

3. A process as defined in claim 1 wherein said crystalline material is selected from the group consisting of silicalite, UHP-Y zeolite, ZSM-5 zeolite, and ZSM-11 zeolite.

4. A process as defined in claim 1 wherein said material comprises a zeolite.

5. A process for oxidizing hydrogen sulfide comprising contacting hydrogen sulfide and an oxidant gas comprising a component selected from the group consisting of sulfur dioxide and oxygen with a catalyst comprising a vanadium component in combination with a component of bismuth, tin, or antimony on a support containing a crystalline material comprising a zeolite having a SiO$_2$/Al$_2$O$_3$ molar ratio of from 4.5 to 35, the essential X-ray diffraction pattern of zeolite Y, an ion exchange capacity of not greater than 0.070, a unit cell dimension of from 24.20 to 24.45 Å, a surface area of at least 350 m$^2$/g (B-E-T), a sorptive capacity for water vapor at 25° C. and a $p/p^*$ of 0.10 of less than 5.00 weight percent and a Residual Butanol Test value of not more than 0.40 weight percent under conditions causing said hydrogen sulfide to react with said component to produce elemental sulfur.

6. A process as defined in claim 1, 2, 4, or 5 wherein said contacting is at a temperature above the sulfur vapor dew point.

7. A process as defined in claim 6 wherein said support consists essentially of materials having, in its anhydrous form, a water sorption capacity of no more than 0.05 gram per gram when the water vapor partial pressure at 25° C. to the water vapor saturation pressure at 25° C. is 0.8.

8. A process as defined in claim 6 wherein said hydrogen sulfide is contained in a gas stream containing water vapor from geothermal steam.

9. A process as defined in claim 6 wherein said oxidant comprises oxygen.

10. A process as defined in claim 9 wherein water vapor is present during said contacting and said contacting is at a temperature below about 475° F.

11. A process as defined in claim 1, 2, 4, or 5 wherein said catalyst contains a vanadium component and a bismuth component.

12. A process as defined in claim 8 wherein said contacting is at a temperature above the sulfur vapor dew point.

13. A process as defined in claim 11 wherein said support consists essentially of materials having, in its anhydrous form, a water sorption capacity of no more than 0.05 gram per gram when the water vapor partial pressure at 25° C. to the water vapor saturation pressure at 25° C. is 0.8.

14. A process as defined in claim 13 wherein said oxidant comprises oxygen.

15. A process as defined in claim 14 wherein water vapor is present during said contacting and said contacting is at a temperature below about 475° F.

16. A process as defined in claim 11 wherein said hydrogen sulfide is contained in a gas stream containing water vapor from geothermal steam.

17. A process as defined in claim 11 wherein said oxidant comprises oxygen.

18. A process as defined in claim 17 wherein water vapor is present during said contacting and said contacting is at a temperature below about 475° F.

19. A process as defined in claim 1, 2, or 5 wherein said hydrogen sulfide is contained in a gas stream containing water vapor from geothermal steam.

20. A process for oxidizing hydrogen sulfide comprising contacting hydrogen sulfide and an oxidant gas comprising a component selected from the group consisting of sulfur dioxide and oxygen with a catalyst comprising a vanadium component in combination with a component of bismuth, tin, or antimony on a support containing silicalite under conditions causing said hydrogen sulfide to react with said component to produce elemental sulfur.

21. A process as defined in claim 20 wherein said contacting is at a temperature above the sulfur vapor dew point.

22. A process as defined in claim 20 wherein said catalyst contains a vanadium component and a bismuth component.

23. A process as defined in claim 22 wherein said contacting is at a temperature above the sulfur vapor dew point.

24. A process as defined in claim 20, 21, 22, or 23 wherein said support consists essentially of silicalite and materials capable of sorbing no more than 0.05 gram of water per gram when the ratio of partial pressure of water vapor at 25° C. to the water saturation pressure at 25° C. is 0.8.

25. A process as defined in claim 24 wherein said hydrogen sulfide is present with water vapor from geothermal steam.

26. A process as defined in claim 20, 21, 22, or 23 wherein said support consists essentially of silicalite and amorphous silica.

27. A process as defined in claim 20, 21, 22, or 23 wherein said hydrogen sulfide is present with water vapor from geothermal steam.

28. A process as defined in claim 1, 2, 4, 5, 20, 21, 22, 25 wherein said oxidant comprises oxygen.

29. A process as defined in claim 28 wherein water vapor is present during said contacting and said contacting is at a temperature below about 475° F.

30. A process as defined in claim 1 or 18 wherein said catalyst contains in said support a porous refractory oxide having a mean pore diameter of 80 angstroms or more and said contacting is in the presence of water vapor.

31. A process as defined in claim 1 or 18 wherein said catalyst contains in said support a porous refractory oxide having a mean pore diameter greater than 200 angstroms.

32. A process as defined in claim 31 wherein said conditions are such that the water vapor partial pressure is between 88 and 95 percent of the saturated water vapor partial pressure.

33. A process as defined in claim 32 wherein said catalyst consists essentially of vanadium and bismuth components on said support.

34. A process as defined in claim 32 wherein said catalyst comprises about 8 to about 20 weight percent bismuth components, calculated as $Bi_2O_3$, and about 7 to 15 weight percent vanadium components, calculated as $V_2O_5$.

35. A process as defined in claim 31 wherein said catalyst comprises vanadium and bismuth components.

36. A process as defined in claim 35 wherein said contacting is at a temperature below about 475° F.

37. A process as defined in claim 36 wherein said conditions are such that the water vapor partial pressure is between 88 and 95 percent of the saturated water vapor partial pressure.

38. A process as defined in claim 31 wherein said conditions are such that the water vapor partial pressure is between 88 and 95 percent of the saturated water vapor partial pressure.

39. A process for oxidizing hydrogen sulfide comprising contacting hydrogen sulfide and an oxidant gas comprising a component selected from the group consisting of sulfur dioxide and oxygen with a catalyst comprising a vanadium component in combination with a component of bismuth, antimony, or tin on a support containing ZSM-5 or ZSM-11 zeolite under conditions causing said hydrogen sulfide to react with said component to produce elemental sulfur.

40. A process as defined in claim 1, 4, 5, or 39 wherein said catalyst comprises bismuth and vanadium components and said zeolite is essentially free of alkali metals and alkaline earth metals.

41. A process as defined in claim 40 wherein said oxidant gas comprises oxygen.

42. A process for oxidizing hydrogen sulfide comprising contacting hydrogen sulfide and an oxidant gas comprising a component selected from the group consisting of sulfur dioxide and oxygen with a catalyst comprising a metal component catalytically active for oxidizing hydrogen sulfide to sulfur on a support containing a crystalline material selected from the group consisting of a crystalline silica molecular sieve or a crystalline zeolite, said silica or zeolite having a water sorption capacity of no more than 0.05 gram of water per anhydrous gram of crystalline material when the ratio of the water vapor partial pressure at 25° C. to the water saturation pressure at 25° C. is 0.8, under conditions causing said hydrogen sulfide to react with said component to produce elemental sulfur.

43. A process as defined in claim 42 wherein said metal component comprises vanadium.

44. A process as defined in claim 43 wherein said oxidant gas comprises oxygen.

45. A process as defined in claim 42 wherein said oxidant gas comprises oxygen.

46. A process as defined in claim 42, 43, 45, or 44 wherein said crystalline material is selected from the group consisting of silicalite, ZSM-5, ZSM-11, or UHP-Y zeolite.

47. A process as defined in claim 46 wherein said contacting is at a temperature above the sulfur vapor dew point.

48. A process as defined in claim 3, 42, 43, 45, or 44 wherein said contacting is at a temperature above the sulfur vapor dew point.

49. A process as defined in claim 48 wherein said crystalline material is selected from silicalite or UHP-Y zeolite.

* * * * *

UNITED STATES PATENT AND TRADEMARK OFFICE
CERTIFICATE OF CORRECTION

PATENT NO. : 4,576,814
DATED : March 18, 1986
INVENTOR(S) : Robert H. Hass and John W. Ward It is certified that error appears in the above-identified patent and that said Letters Patent are hereby corrected as shown below:

In column 23, line 21, after "catalyst" insert -- further --.

In column 23, line 23, change "8" to -- 11 --.

In column 24, line 18, change "18" to -- 20 --.

In column 24, line 23, change "18" to -- 20 --.

In column 24, line 47, change "31" to -- 35 --.

Signed and Sealed this

Seventeenth Day of June 1986

[SEAL]

Attest:

DONALD J. QUIGG

Attesting Officer

Commissioner of Patents and Trademarks